3,297,480
METHOD FOR PREPARING STARCH HAVING IMPROVED AMYLASE ADSORPTIVE CAPACITY
Osaharu Matsuda, Ikeda, Kiyoshi Kusai, Toyonaka, Makoto Tsukamoto, Koya, Itami, and Toshiaki Komaki, Amagasaki, Japan, assignors to Nagase & Co., Ltd., Osaka, Japan
No Drawing. Filed Sept. 9, 1963, Ser. No. 307,351
Claims priority, application Japan, Sept. 11, 1962, 37/39,156
4 Claims. (Cl. 127—71)

The present invention relates to the preparation of starch having an improved amylase adsorptive capacity.

In the commercial production of enzymatic preparations, it is very advantageous to employ a substance which is capable of adsorbing the desired enzyme selectively. For example, the method which comprises contacting an $\alpha$-amylase containing liquid obtained by the culture of a microorganism with starch to cause the $\alpha$-amylase to be substantially selectively adsorbed on said starch has been commercially practiced for many years to separate $\alpha$-amylase from the other enzymes and also to purify $\alpha$-amylase. The starch with $\alpha$-amylase adsorbed thereon is then separated from the liquid by a suitable procedure such as filtration or centrifuge and dried. The use of such starch on which $\alpha$-amylase has been adsorbed is well known in the art. For example, the starch is treated with a solvent for $\alpha$-amylase to elute the amylase out of starch and to obtain a solution of $\alpha$-amylase with a high concentration and purity.

For this purpose, commercial pulverized starch obtained from cereals such as corn, wheat, rice, etc. has conventionally been used as such or without subjecting the same to any further treatment. However, such commercial cereal starch is relatively low in amylase-adsorptive capacity and therefore is not fully satisfactory in the commercial application. It is also known that potato starch as such has no noticeable capacity of adsorbing amylase. In these circumstances, it is strongly desired to improve amxylase adsorptive capacity of starch by a simple treatment of the starch.

It is a primary object of this invention to provide a novel method for preparing starch having an improved amylase adsorptive capacity.

It is another object of this invention to provide a very simple method to improve the amylase adsorptive capacity not only of cereal starch but also of potato starch.

It is still another object of this invention to provide a simple method by which the amylase adsorptive capacity of starch is remarkably increased without rendering procedures such as adsorption, filtration, washing, elution, etc. more difficult.

These and other objects, features and advantages of this invention will be clear from the following detailed description.

Briefly, the method of this invention is characterized by exposing pulverized starch to steam at a temperature higher than 100° C.

In carrying out the method of this invention any starch may be used. Thus, for example, starch of corn, wheat, rice and other cereals may be used. According to this invention, even starch of white potatoes and sweet potatoes may also be improved in their amylase adsorptive capacity. Commercial pulverized starch of cereals usually contains about 12–14% by weight of moisture or water, while commercial pulverized starch of potatoes usually contains about 15–18% by weight of moisture or water. Such a water content is that naturally adsorbed by ordinary commercial starch, and whenever starch is left standing alone under normal conditions it reaches an equilibrium at or around the aforementioned water content ranges. It will, of course, be understood that dehydrated starch which contains a lesser amount of water may also be used. It is also possible to employ a starch which contains a larger amount of water. However, when a larger amount of water is contained in starch, a larger amount of undesirable amylase-digestive component is produced by the pressurized steam treatment of this invention. Therefore, it is preferable that the starch to be treated according to this invention contains less than 25% water, more preferably less than 20% by weight. The particle size of starch powder is not critical so far as it is produced by usual pulverizers at starch manufacturing mills. In view of ease of availability, cost, etc. it is most advantageous to use commercial starch as such.

According to this invention such starch is treated with water steam at a temperature higher than 100° C. This treatment can be carried out in any suitable manner and with any proper apparatus providing that steam having a temperature higher than 100° C. contacts starch particles as much as possible, and preferably substantially all. Furthermore, it is necessary to take precautions against contact of condensed water with the starch, because if an unduly large amount of water is condensed on the starch or if an unduly large amount of condensed water drips unto the starch, there is produced too great an amount of pasty starch which would result in a swollen and amylase digestive form of starch which has no amylase adsorptive capacity. The steam which is contacted with the starch may be super heated water vapor but it is preferable to use a pressurized saturated water steam having a temperature higher than 100° C., preferably between 100° C. and 135° C. The particular temperature varies between the range specified above and depends upon the particular starch to be treated, the desired amylase adsorptive capacity, and permissible degree of swelling of starch. Preferably the temperature ranges from 115° C. to 130° C. when using white potato starch and wheat starch while it preferably ranges from 125° C. to 135° C. when using sweet potato starch and corn starch. The time for the treatment is not critical but it is preferable to be such that each of the starch particles is sufficiently exposed to and contacted with the steam. Thus the time varies depending upon the particular apparatus, steam temperature, and amount of starch to be treated. Usually a length of time longer than about 10 minutes is satisfactory and up to about 60 minues is sufficient. However, no adverse effect is seen even when the steam treatment is continued longer.

A simple apparatus useful in carrying out the method of this invention is an autoclave adapted to be able to introduce steam therein. Starch to be treated is spread on a pan as a thin layer (e.g. about 3–5 cm. in thickness) and the pan placed in the autoclave. It is perferable that the gas-tightly closed autoclave is preheated before introducing steam. It is also preferable to cover the starch layer on the pan with a sheet of paper or the like to prevent contact of any condensed water with the starch. Then steam is introduced into the autoclave and the steam treatment of the starch is continued for a desired period of time. In some cases, the starch is cooler than the steam introduced so that a small amount of water is condensed only on the surface of the starch layer, and therefore a larger proportion of the thin face portion is rendered pasty and amylase-digestive in the form of a very thin surface film but the starch of the other or inner portion is improved in amylase adsorptive capacity. If the starch layer is too thick, e.g. 20 cm., and the time of treatment is too short, no remarkable improvement in amylase adsorptive capacity of the starch in the inner portion of the layer is seen because the starch particles in this inner portion are not fully exposed to the steam at a high temperature. If desired about 10–30% of porous diatomaceous earth may be mixed with the starch so that the starch is more accessible to steam.

It is also possible to employ a tubular or cylindrical treating chamber with an internal screw conveyor and external heating jacket. The chamber is suitably heated by means of the heating jacket and steam is introduced into the chamber. Starch is continuously conveyed through the chamber by means of the screw conveyor. The interior of the chamber is so conditioned by controlling the external heating and steam introduced into the chamber that starch is exposed to saturated steam at a temperature higher than 100° C. at all times. This apparatus is convenient because the steam treatment of starch according to this invention can be carried out continuously.

Starch which has been steam treated according to this invention has a remarkably improved amylase adsorptive capacity. In contrast thereto, when starch mixed with a larger amount of water is heated the starch is rendered pasty and becomes easily digestable with amylase. When starch is subjected to a dry heat-treatment no noticeable change in amylase-adsorptivity and amylase-digestivity is seen. While the reason why the amylase-adsorptivity is so remarkably increased according to the steam treatment of this invention is not exactly known, it is believed that due to the steam treatment there occurs certain movement of water retained in the starch molecule so that the molecular arrangement of starch is disordered with the result that there is formed a number of small voids or crevices, although no noticeable change in visible appearance occurs.

The starch having improved amylase adsorptive capacity and prepared according to this invention may be used in a conventional manner in absorbing α-amylase contained in a solution. The amylase to be absorbed by the starch of this invention may be any α-amylase produced by any kind of microorganism such as *Bacillus subtilis* mold, etc. and may be that contained in malt. Thus, for example, an α-amylase containing solution resulting from the culture of a microorganism is preferably added with 5–20% of an inorganic salt such as ammonium sulfate or sodium chloride or an organic solvent such as methanol, ethanol, or isopropanol. The temperature of the solution may be room temperature (i.e. 20–30° C.), but when the salt or organic solvent content is relatively small (e.g. less than about 10%) it is preferable that the solution is cooled below 20° C. The pH of the solution should be within a range (e.g. pH 6–7) wherein α-amylase is stable.

The adsorption of α-amylase in the above solution by the starch prepared by this invention may be carried out in the so-called batch process or column process. When using the batch process the starch powder is added to the solution and stirred. The amount of starch varies depending upon the total amylase activity in the solution. Usually, in the case of a solution resulting from the culture of a microorganism, about 1–3% of the starch by weight based on the solution is satisfactory. The stirring is continued until no more amylase is adsorbed by the starch. Generally up to about 3 hours is sufficient. Then the starch is separated from the solution by means of filtration or centrifugation.

When the column method is used, about 0.3 to 1.0 part by weight of a filter aid (e.g. diatomaceous earth) is mixed with one part of the starch, and the mixture is placed in a column (e.g. about 10–15 cm. in height). Then the amylase-containing solution is slowly passed through the column so that α-amylase in the solution is adsorbed on the starch.

The starch on which α-amylase has been adsorbed is washed and dried in the usual manner. Since the procedure for adsorbing α-amylase on starch is conventional and well known in the art no further detailed explanation is deemed necessary.

The present invention is illustrated in the following examples.

*Example 1*

In this example various kinds of commercial starches were treated with saturated steam under various temperature conditions. In each case, the starch to be treated was spread on an open top dish as a layer of 3 cm. in thickness. The open top of the vessel was covered with a cloth and the vessel was placed in an autoclave. With the vent hole slightly opened, pressurized steam was introduced into the vessel through a steam inlet. After a predetermined pressure was attained in the vessel, the vent hole and steam inlet valve were regulated so that the said pressure was maintained for 20 minutes.

After this treatment, 30 grams of the treated starch were taken and dispersed in a 15% aqueous solution of ammonium sulfate. The dispersion was filtered through a glass wool funnel to form a starch layer thereon.

Through this starch layer was passed 2000 ml. of an amylase-containing solution which was prepared by adding 15% of ammonium sulfate to a culture filtrate obtained by the culture of *Bacillus subtilis* and containing 1700 DUN/ml. of α-amylase (namely, one gram of crystalline α-amylase per liter). Thus α-amylase contained in the solution was adsorbed on the starch on the funnel. Then the starch with amylase adsorbed thereon was dispersed in 500 cc. of an aqueous solution of calcium chloride. The total amylase activity was measured with respect to each of the above dispersion, amylase-containing solution before the adsorption treatment and the filtrate passed through the starch layer of the funnel, in order to determine the amount of α-amylase adsorbed on one gram of the starch used. Apart from this, a portion of the steam treated starch was dispersed in an aqueous solution containing 50 DUN/ml. amylase and the dispersion was left standing for 5 hours at 40° C. Then the dispersion was filtered through a glass wool filter to determine the amount of component in the starch which is digestible with the amylase. The results are as listed in the following table:

| Starch Moisture | Potato, 18% | Sweet Potato, 17.5% | Corn, 12.5% | Wheat, 13% |
|---|---|---|---|---|
| Steam temp.: | | | | |
| Control— | | | | |
| A | 10 | 135 | 13,500 | 9,500 |
| B | | | | |
| C | | | | |
| 106° C.— | | | | |
| A | 3,300 | 9,800 | 16,200 | 20,000 |
| B | 2.82% | 3.58% | 3.76% | 10.3% |
| C | 3,390 | 10,150 | 16,850 | 22,300 |
| 115° C.— | | | | |
| A | 30,400 | 34,200 | 24,200 | 33,700 |
| B | 9.8% | 4.85% | 5.00% | 16.7% |
| C | 33,700 | 35,950 | 25,500 | 40,450 |
| 117° C.— | | | | |
| A | 66,700 | 37,000 | 33,000 | 40,000 |
| B | 36.7% | 6.30% | 6.50% | 18.3% |
| C | 105,400 | 39,500 | 35,300 | 49,000 |
| 120° C.— | | | | |
| A | 77,500 | 40,000 | 35,000 | 47,400 |
| B | 55.5% | 7.1% | 6.87% | 21.0% |
| C | 174,200 | 43,100 | 37,600 | 60,000 |
| 127° C.— | | | | |
| A | 82,500 | 53,700 | 80,000 | 82,000 |
| B | 67.8% | 25.6% | 27.4% | 59.3% |
| C | 256,500 | 72,200 | 110,000 | 201,200 |
| 133° C.— | | | | |
| A | 72,000 | 70,000 | 65,000 | 70,000 |
| B | 73.0% | 32.6% | 49.2% | 66% |
| C | 266,700 | 103,800 | 128,000 | 206,000 |

A: The amount (DUN) of α-amylase adsorbed on one gram of the steam treated starch used.
B: The amount of amylase-digestive starch in the steam treated starch (percent).
C: The amount (DUN) of α-amylase adsorbed on one gram of starch which is non-digestible with amylase.
DUN: 17,000 DUN corresponds to 10 mg. of crystalline amylase.

*Example 2*

Following the procedure of Example 1, 10 kg. of commercial potato starch was steam treated at a gauge pressure of 1.5 kg./cm.² (at 127° C.) for 60 minutes. The highly adsorptive starch thus prepared was dispersed in about 30 liters of a 15% aqueous solution of ammonium sulfate. The dispersion was poured into 500 liters of a 15% aqueous solution of ammonium sulfate containing 2000 DUN/ml. of amylase and 1000 units/ml. of protease. After stirring for 20 minutes the dispersion was filtered to collect the starch, which was rapidly dried at 45° C. to obtain 9 kg. of dried starch powder containing 53,000 DUN of amylase per gram. The filtrate contained 1000 DUN/ml. of amylase and 1000 units/ml. of protease, which was subjected to salting-out and subsequent purification to obtain an enzymatic preparation containing about equal amount of protease and amylase and suitable for use as a digestive agent.

*Example 3*

Twelve kg. of commercial corn starch were mixed with 3 kg. of diatomaceus earth, and the mixture was spread on an aluminum pan (about 1.0 m.²). The pan was placed in an autoclave and the starch was exposed to steam at a gauge pressure of 1.5 kg./cm.² (127° C.) for 30 minutes.

The steam treated starch mixed with diatomaceus earth was added to 500 liters of an enzyme solution (pH 6.0) containing about 15% of ammonium sulfate and 230 DUN/ml. of amylase, and the mixture was stirred for about 3 hours. Then the mixture was centrifuged. The filtrate contained 30 DUN/ml. of amylase and the total amount of amylase adsorbed on the starch was $1 \times 10^6$ DUN. The filter cake was washed with a 15% aqueous solution of ammonium sulfate and was then dehydrated. The dehydrated starch (with diatomaceus earth) was then added to 500 liters of an aqueous solution (pH 6.0) containing 18% of ammonium sulfate and 1700 DUN/ml. of amylase. The mixture was stirred for 3 hours and subjected to centrifuge in the same manner as mentioned above. The filter cake was collected and shaped into pellets by a pelletizing machine. The pellets were dried by an air dryer to obtain 8.0 kg. of dried pellets containing 5% of water, 13% of ammonium sulfate and 3.9% of diatomaceous earth. Each pellet contained 90,000 DUN of amylase per one gram. The yield of amylase recovery was about 90%.

What we claim is:

1. A method for preparing starch having improved amylase adsorption capacity which comprises treating starch containing not more than 25%, by weight, of water with steam having a temperature of between 100° and 135° C. until substantially all of the starch reaches a temperature higher than 100° C.

2. A method for preparing starch having an improved amylase adsorption capacity according to claim 1 in which the starch is a member selected from the group consisting of potato starch and wheat starch and the steam temperature is 115–130° C.

3. A method for preparing starch having an improved amylase adsorption capacity according to claim 1 in which the starch is a member selected from the group consisting of sweet potato starch and corn starch and the steam temperature is 125–135° C.

4. A method for preparing starch having an improved amylase adsorption capacity as claimed in claim 1 in which the starch is exposed to pressurized and saturated steam of a temperature between 100° C. and 135° C.

References Cited by the Examiner

UNITED STATES PATENTS

| | | | |
|---|---|---|---|
| 3,029,192 | 4/1962 | Kerbs | 127—36 |
| 3,137,639 | 6/1964 | Hurst et al. | 195—31 |
| 3,149,049 | 9/1964 | Walkup et al. | 195—31 |
| 3,185,633 | 5/1965 | Kerbs | 127—38 |

MORRIS O. WOLK, *Primary Examiner.*

E. G. WHITBY, *Assistant Examiner.*